United States Patent
Tang et al.

(10) Patent No.: US 11,107,349 B2
(45) Date of Patent: Aug. 31, 2021

(54) SIDEWALK DETECTION FOR ELECTRIC SCOOTERS

(71) Applicant: AitronX Inc., Saratoga, CA (US)

(72) Inventors: Xinlu Tang, Cupertino, CA (US); Alexandra Li, Saratoga, CA (US); Chen Zhong, Guangdong (CN); Fang Jiang, Nanshan Shenyang (CN); Quan Zhang, Guangdong (CN); Yong-Gang Sun, Guangdong (CN)

(73) Assignee: AitronX Inc., Saratoga, CA (US)

( * ) Notice: Subject to any disclaimer, the term of this patent is extended or adjusted under 35 U.S.C. 154(b) by 49 days.

(21) Appl. No.: 16/654,544

(22) Filed: Oct. 16, 2019

(65) Prior Publication Data
US 2020/0250975 A1 Aug. 6, 2020

Related U.S. Application Data

(60) Provisional application No. 62/799,526, filed on Jan. 31, 2019.

(51) Int. Cl.
*G06K 9/00* (2006.01)
*G08G 1/0962* (2006.01)
(Continued)

(52) U.S. Cl.
CPC ............ *G08G 1/09626* (2013.01); *B62J 3/00* (2013.01); *B62J 99/00* (2013.01); *G06K 9/00369* (2013.01);
(Continued)

(58) Field of Classification Search
CPC ............ G08G 1/09626; G06K 9/6256; G06K 9/00798; G06K 9/00369; B62J 99/00; B62J 3/00; B62J 45/40; B62J 50/20; G06N 20/00; B62K 2202/00; B62K 11/00; B62K 2204/00; B62K 3/002
See application file for complete search history.

(56) References Cited

U.S. PATENT DOCUMENTS 9,037,125 B1 * 5/2015 Kadous .................. G06F 3/014
455/418
2006/0265154 A1 * 11/2006 Potts .................... G01M 17/02
702/56

(Continued)

FOREIGN PATENT DOCUMENTS

KR 100804490 * 2/2008 ............... B60R 1/06

*Primary Examiner* — Amara Abdi
(74) *Attorney, Agent, or Firm* — Young Basile Hanlon & MacFarlane, P.C.

(57) ABSTRACT

Systems, devices, and methods for detection of a scooter riding environment are described. A scooter alarm and pedestrian walkway detection system includes an alarm, a movement sensor configured to detect motion of a scooter and transmit motion data indicative of the motion to a processor, and an image capture device configured to detect features of a riding environment of the scooter and transmit riding environment data indicative of the features to the processor. The processor is configured to determine whether the riding environment of the scooter is a pedestrian walkway based on the motion data and the riding environment data. The processor is configured to activate the alarm in response to determining that the riding environment of the scooter is a pedestrian walkway.

20 Claims, 11 Drawing Sheets

(51) Int. Cl.
  *G06K 9/62*   (2006.01)
  *B62J 99/00*  (2020.01)
  *G06N 20/00*  (2019.01)
  *B62J 3/00*   (2020.01)
  *B62K 11/00*  (2006.01)
  *B62J 45/40*  (2020.01)
  *B62J 50/20*  (2020.01)

(52) U.S. Cl.
  CPC ....... *G06K 9/00798* (2013.01); *G06K 9/6256* (2013.01); *G06N 20/00* (2019.01); *B62J 45/40* (2020.02); *B62J 50/20* (2020.02); *B62K 11/00* (2013.01); *B62K 2202/00* (2013.01)

(56) References Cited

U.S. PATENT DOCUMENTS

| | | | |
|---|---|---|---|
| 2018/0101179 A1* | 4/2018 | Louey | B60L 50/52 |
| 2018/0336692 A1* | 11/2018 | Wendel | G06K 9/00825 |
| 2020/0124430 A1* | 4/2020 | Bradlow | B62J 99/00 |
| 2020/0143237 A1* | 5/2020 | Gordon | G06N 3/08 |

* cited by examiner

US 11,107,349 B2

SIDEWALK DETECTION FOR ELECTRIC SCOOTERS

CROSS-REFERENCE TO RELATED APPLICATION

This application claims priority to U.S. Provisional Patent Application No. 62/799,526, filed Jan. 31, 2019, which is incorporated herein in its entirety by reference.

TECHNICAL FIELD

This disclosure relates to electric scooters, and more particularly, to alarm and sidewalk detection systems for electric scooters.

BACKGROUND

Electric scooters provide a convenient source of entertainment and urban transportation. Electric scooters used for transportation can include a driving range of over 20 miles and a top speed of up to 20 miles per hour. Commercial sharing of lightweight and portable electric scooters has increased the prevalence of electric scooters in urban areas often traveled by pedestrians. The presence of electric scooters in pedestrian-dense areas such as sidewalks can create a nuisance for pedestrians near the electric scooters.

SUMMARY

One aspect of this disclosure is a scooter comprising an alarm and a movement sensor configured to detect motion of the scooter and transmit motion data indicative of the motion to a processor. The processor is configured to determine whether a riding environment of the scooter is a pedestrian walkway based on the motion data. The processor is configured to activate the alarm in response to determining that the riding environment of the scooter is a pedestrian walkway.

Another aspect of this disclosure is a method for activating an alarm in response to determining that a riding environment of a scooter is a pedestrian walkway. The method includes receiving motion data from a movement sensor configured to detect motion of the scooter. The method includes receiving riding environment data from an image capture device configured to detect the riding environment of the scooter. The method includes determining whether the riding environment of the scooter is a pedestrian walkway based on the motion data and the riding environment data. The method includes activating the alarm in response to determining that the riding environment of the scooter is a pedestrian walkway.

Another aspect of this disclosure is a scooter alarm and pedestrian walkway detection system including an alarm and a movement sensor configured to detect motion of a scooter and transmit motion data indicative of the motion to a processor. The scooter alarm and pedestrian walkway detection system includes an image capture device configured to detect features of a riding environment of the scooter and transmit riding environment data indicative of the features to the processor. The processor is configured to determine whether the riding environment of the scooter is a pedestrian walkway based on the motion data and the riding environment data. The processor is configured to activate the alarm in response to determining that the riding environment of the scooter is a pedestrian walkway.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Unless otherwise noted, like numerals represent like elements within the drawing figures.

DETAILED DESCRIPTION

Disclosed herein are devices, systems, and methods for pedestrian walkway detection for electric scooters. By determining that an electric scooter is being operated on a pedestrian walkway and activating an alarm alerting a user and/or pedestrians of the electric scooter's presence on the pedestrian walkway, a pedestrian walkway detection system can improve the use of electric scooters. The pedestrian walkway detection system can include a movement sensor, such as an inertial measurement unit, and an image capture device, such as a camera. The movement sensor can measure motion of the scooter and can transmit motion data indicative of the motion to a processor. The image capture device can capture images and/or video (e.g. real time video) of riding environment features surrounding the electric scooter such as obstacles, pedestrians, traffic signs, traffic signals, and/or road markings and can transmit data indicative of the features to the processor. The processor can determine whether the riding environment of the electric scooter includes a pedestrian walkway based on the data transmitted from the movement sensor and/or the image capture device. If the processor determines that the electric scooter is being ridden on a pedestrian walkway, that there is no drivable path for the electric scooter, or that an obstacle is located near the electric scooter, an alarm can alert a user of the electric scooter and/or nearby pedestrians.

Figure 1:
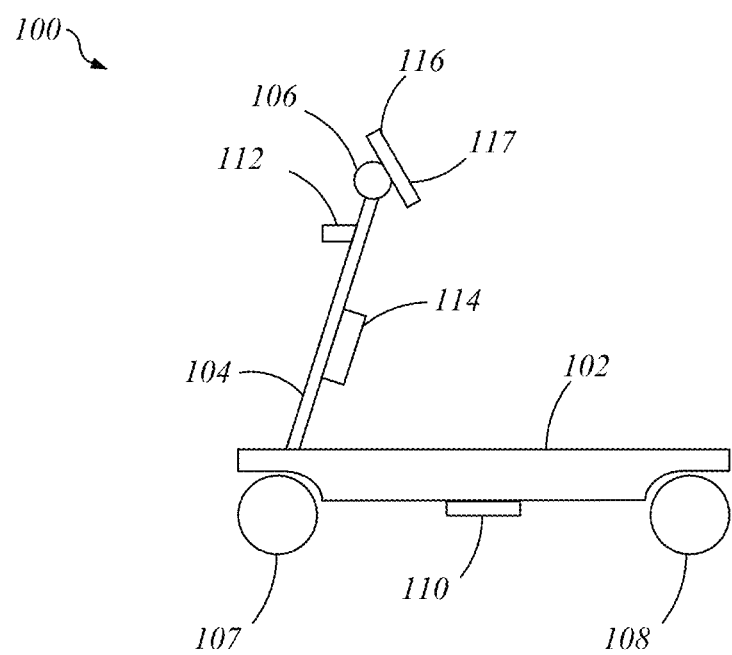
FIG. 1 is a side view of an electric scooter.

FIG. 1 is a side view of an electric scooter 100. The electric scooter 100 can include a deck 102, a handlebar 104, one or more grips 106, and a front wheel 107, and a rear wheel 108. A pedestrian walkway detection system for the electric scooter 100 can include a sensor (also referred to as a movement sensor) 110, an image capture device 112, a processor 114, and an alarm 116.

The movement sensor 110 can be configured to detect motion of the electric scooter 100 and can include one or more accelerometers, gyroscopes, inertial measurement units (IMUs), vibration sensors, magnetometers, any other sensor capable of detecting motion of the electric scooter 100, or any combination thereof. Additionally and/or alternatively, the movement sensor 110 can include an audio sensor configured to detect sound resulting from contact between one or both of the wheels 107, 108 of the electric scooter 100 and a riding surface of the scooter (e.g. a sidewalk, a bike lane, or a road). For example, a sound may result when the wheels 107,108 are ridden over features of the riding surface such as pavement joints or curbs. The movement sensor 110 can transmit motion data indicative of the measured motion to the processor 114. In the illustrated, non-limiting example, the movement sensor 110 is attached to an underside of the deck 102. In other embodiments, the movement sensor 110 may be attached to the handlebar 104 or to any other portion of the electric scooter 100. The movement sensor 110 can include a sensitivity optimized to detect movement of particular components of the electric scooter 100, such as the deck 102, the front wheel 107, or the rear wheel 108. Multiple movement sensors 110 can be attached to the electric scooter 100. For example, a first movement sensor can be attached to a front end of the deck 102 adjacent to the front wheel 107 and a second movement sensor can be attached to a rear end of the deck 102 adjacent to the rear wheel 108. The first movement sensor can be configured to detect movement of the front wheel 107 and the second movement sensor can be configured to detect movement of the rear wheel 108.

Figure 2:
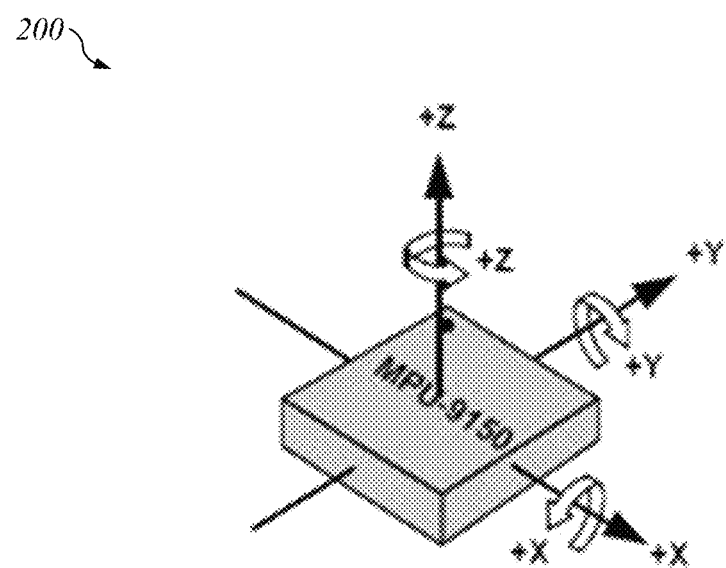
FIG. 2 is a top perspective view of an IMU that can be included in a movement sensor according to one example.

FIG. 2 shows an example of an IMU 200 that can be included in the movement sensor 110. The IMU 200 can provide six-dimensional motion sensing over six degrees of freedom (DOF) by sensing translational movement of the electric scooter in three perpendicular axes and rotational movement of the electric scooter about three perpendicular axes. The IMU can measure this movement at a high sampling rate (e.g. up to 200 Hz). In other embodiments, the IMU 200 can provide motion sensing in more or less than six dimensions over more or less than six DOF.

The image capture device 112 can include a camera (e.g. front-facing camera) or any other image-capturing device configured to capture images and/or video of a riding environment surrounding the electric scooter 100. The riding environment can include a surface on which the electric scooter 100 is being operated (e.g. road, bike path, or sidewalk) and/or physical surroundings of the electric scooter 100. The image capture device 112 can detect features of the riding environment including but not limited to obstacles (e.g. pedestrians, buildings, vehicles, or other structures), pedestrian walkways (e.g. sidewalks or other walking paths), traffic signs, traffic signals, road markings (e.g. traffic lane lines), or bike path markings. In the illustrated, non-limiting example, the image capture device 112 is attached to the handlebar 104. In other embodiments, the image capture device 112 is attached to the grips 106 or to any other portion of the electric scooter 100. Multiple image capture devices 112 can be attached to the same or different portions of the electric scooter 100. The multiple image capture devices 112 can have the same or different fields of view. For example, the pedestrian walkway detection system can include one or more front facing cameras, side facing cameras, or rear facing cameras positioned at different angles relative to the electric scooter 100. The image capture device 112 can transmit riding environment data indicative of the detected features of the riding environment to the processor 114.

The alarm 116 is a notification device activated by the processor 114. For example, in response to determining that the riding environment of the electric scooter 100 is a pedestrian walkway based on the motion data and the riding environment data, the processor 114 can activate the alarm 116. The alarm 116 can include a display 117 and the display 117 can generate a notification (e.g. a message, symbol, or light) in response to the processor 114 activating the alarm 116. In other embodiments, the alarm 116 includes a light that illuminates in response to the processor 114 activating the alarm 116. In yet other embodiments, the alarm 116 includes a speaker that emits sound in response to the processor 114 activating the alarm 116. The alarm 116 is not limited to the examples shown and described. In the illustrated, non-limiting example, the alarm 116 is attached to the grips 106. In other embodiments, the alarm 116 can be attached to the handlebar 104, the deck 102, or any other portion of the electric scooter 100. In other embodiments, the alarm 116 includes an external device such as a mobile phone, a watch, a tablet computer, or any other suitable wearable or nonwearable device that is connected to the processor 114. The external device can be connected to the processor 114 using a wired or wireless connection.

The alarm 116 is observable by the user of the electric scooter 100 and/or pedestrians near the electric scooter 100. The alarm 116 can dissuade the user from operating the electric scooter 100 on pedestrian walkways, notify the user of a status of the electric scooter 100, notify the user of improper use of the electric scooter 100, and/or alert surrounding pedestrians to the electric scooter's presence.

Figure 3:
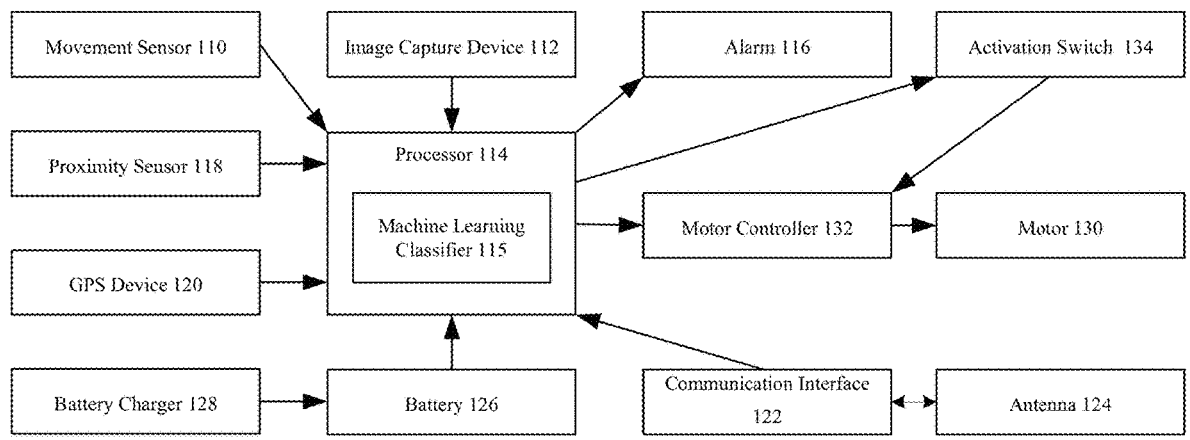
FIG. 3 is a block diagram of components of the electric scooter 100 according to one example.

FIG. 3 is a block diagram of components of the electric scooter 100 according to one example. The electric scooter 100 can include the movement sensor 110, the image capture device 112, the processor 114, the alarm 116, a proximity sensor 118, a GPS device 120, a communication interface 122, an antenna 124, a battery 126, a battery charger 128, a motor 130, a motor controller 132, and an activation switch 134. Each of the described components can be in electrical communication with the processor 114 using a wired or wireless connection.

The proximity sensor 118 can detect obstacles near the electric scooter 100 and can include any radar sensor, ultrasonic sensor, infrared sensor, lidar sensor, any other sensor suitable for detecting obstacles near the electric scooter 100, or any combination thereof. The proximity sensor 118 can transmit obstacle data indicative of obstacles detected by the proximity sensor 118 to the processor 114. The processor 114 may determine whether the riding environment of the electric scooter 100 is a pedestrian walkway based on the obstacle data from the proximity sensor 118, motion data from the movement sensor 110, and/or riding environment data from the image capture device 112. The proximity sensor 118 can be used independently or in combination with the image capture device 112 to detect features of the riding environment of the electric scooter 100.

The GPS device 120 can determine the location of the electric scooter 100 and may transmit data indicative of the location of the electric scooter 100 to the communication interface 122 and/or to the processor 114. The processor 114 may determine whether the riding environment of the electric scooter 100 is a pedestrian walkway based on the data received from the GPS device 120, the proximity sensor 118, motion data from the movement sensor 110, and/or riding environment data from the image capture device 112.

The communication interface 122 can enable networked communication. Data can be sent from the communication interface 122 to one or more external devices including but not limited to an email system, a mobile phone, a tablet computer, a laptop computer, a notebook computer, a desktop computer, a server computer, a cloud-based server, other networked devices or systems, or a combination thereof. The communication interface can communicate with the one or more external devices using a wired or wireless connection (e.g., WiFi, Bluetooth, USB, HDMI, Wireless USB, Near Field Communication (NFC), Ethernet, a radio frequency, and/or other interfaces for communicating data to one or more external devices). In some embodiments, the communication interface 122 can communicate through a cellular network, for example, using 3G, 4G, 5G, CDMA, or GSM. The communication interface 122 can include an antenna 124 used to communicate with the one or more external devices.

Data sent by the communication interface 122 can include the location of the electric scooter 100 determined by the GPS device 120, maintenance status (e.g. battery charge) of the electric scooter 100, and operation status of the electric scooter 100. The operation status can include but is not limited to: presence of the electric scooter 100 on a bike lane, road, or pedestrian walkway; whether the electric scooter 100 has been used to violate traffic laws; or whether the electric scooter 100 has experienced a collision with a vehicle or obstacle. The communication interface 122 can transmit a notification to an external device (e.g. owned by a scooter provider or law enforcement) in response to a violation of traffic laws or operation of the electric scooter 100 in a prohibited area (e.g. on pedestrian walkways). For example, the communication interface 122 can transmit data indicative of a traffic violation to a network. The data can be transmitted from the network to a server including a database. The server can include a hardware component or a software component (e.g. a web server). A user profile including user traffic violations, the user's electric scooter use history, or other user information can be stored on the database and accessed by the user, law enforcement, or a scooter provider, for example.

The communication interface 122 can receive data from the one or more external devices. The communication interface 122 can transmit the received data from the one or more external devices to the processor 114. For example, the communication interface 122 can receive software updates (e.g. firmware updates); instructions to activate or deactivate the electric scooter 100; data indicating prohibited locations; instructions for operation of the alarm 116 (e.g. activation or deactivation); and/or operation parameters of the electric scooter 100. The operation parameters may be customizable and may be determined by traffic laws governing the location in which the electric scooter 100 is operated. For example, operation of electric scooters on sidewalks may be prohibited, or electric scooters may be prohibited from being operated at speeds greater than a speed limit. If the processor 114 determines that the electric scooter 100 is being operating in a prohibited area (e.g. a sidewalk) or that the electric scooter 100 is being operated at a speed greater the speed limit, the processor 114 can activate the alarm 116 and/or deactivate the electric scooter 100 (e.g. by deactivating the motor 130 or the motor controller 132). The determination of the processor 114 to activate the alarm 116 can be based on one or more of the operating parameters.

The battery 126 can operate as an energy source of any described component of the electric scooter 100 and can include one or more batteries of any type (e.g. lithium ion) having any voltage capacity. The battery 126 can be charged by a battery charger 128. The battery 126 can be attached to the handlebar 104, the deck 102, or to any other portion of the electric scooter 100.

The motor 130 can include an electric motor or motor of any other type. The motor 130 can be powered by the battery 126 and can be controlled by a motor controller 132. In some embodiments, the motor controller 132 can be controlled by one or more external devices (e.g. a smartphone) using a wired or a wireless connection. The user and/or a scooter provider can enable or disable the motor 130 and/or the motor controller 132 using a smartphone application, a software as a service product implemented on a smartphone, or any other external device. For example, the user and/or the provider of the software as a service product (e.g. a provider of the electric scooter 100) can activate the activation switch 134 to activate or deactivate the motor 130 and/or the motor controller 132.

The processor 114 can determine whether the riding environment of the electric scooter 100 is a pedestrian walkway (e.g. sidewalk) based on motion data received from the movement sensor 110. The movement sensor 110 can measure movement of the electric scooter 100 over a measurement period (e.g. 10 seconds).

Pedestrian walkways can include distinguishing features which can be detected by the movement sensor 110. The movement sensor 110 can detect a change in position of the electric scooter 100 when the electric scooter 100 is driven over the distinguishing features. The processor 114 can analyze the motion data from the movement sensor 110, determine that the motion data matches a predetermined movement pattern indicative of a pedestrian walkway, and determine that the riding environment of the electric scooter 100 is a pedestrian walkway. For example, sidewalks can include pavement joints along a length of the sidewalk. When the electric scooter 100 is driven over the pavement joints, the pavement joints cause the electric scooter 100 to experience a "bump" excitation. This bump excitation, which may be referred to as vibration or movement, generates an input into a spring-mass dynamic system defined by components of the electric scooter 100. The wheels 107,108 can act as springs of the spring-mass dynamic system and a weight of the electric scooter 100 and a weight of the user can act as the mass. For example, each time the electric scooter 100 is driven over a pavement joint, the electric scooter 100 experiences periodic vibrations of a short duration that occur across a wide excitation frequency range. This movement pattern can be detected by the movement sensor 110, analyzed by the processor 114, and determined by the processor 114 to indicate a pedestrian walkway such as a sidewalk. For example, if the processor 114 determines that the movement pattern of the electric scooter 100 matches a predetermined sidewalk movement pattern, the processor 114 can determine that the riding environment of the electric scooter 100 is a sidewalk and activate the alarm 116.

In contrast, other transportation surfaces such as a road, bike path, or bike lane may not include the same movement pattern. These transportation surfaces may generate a different movement pattern (e.g. cause a higher or lower scooter movement frequency) of the electric scooter 100 detected by the movement sensor 110. These movement patterns can be detected by the movement sensor 110, analyzed by the processor 114, and determined by the processor 114 not to indicate a pedestrian walkway. For example, if the processor 114 determines that the movement pattern of the electric scooter 100 does not match a predetermined sidewalk movement pattern, the processor 114 can determine that the riding environment of the electric scooter 100 is not a sidewalk and determine not to activate the alarm 116. The processor 114 may analyze the motion data detected by the movement sensor 110 to determine whether the riding environment of the electric scooter 100 is a pedestrian walkway by performing a spectrum analysis of the motion data. For example, the processor 114 may analyze a frequency of acceleration or rotation of the electric scooter 100 about one or more axes over time (e.g. the measurement period). The processor 114 may further perform and analyze an autocorrelation of the spectrum analysis to determine whether the riding environment of the electric scooter 100 is a pedestrian walkway.

Figure 4A:
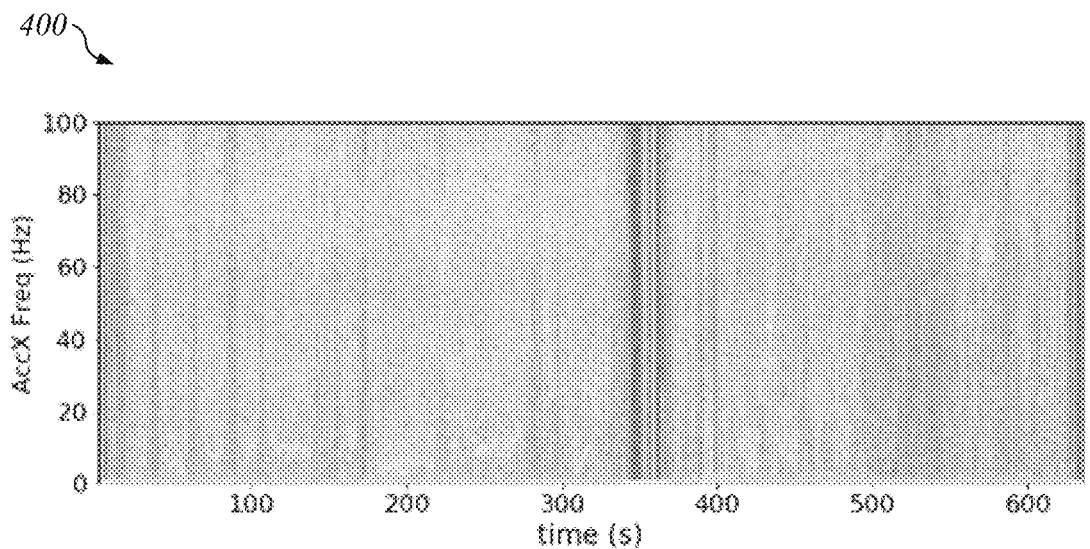
FIG. 4A is a spectrogram illustrating frequency of acceleration of a scooter in a direction along a first axis of a scooter over time.
Figure 4B:
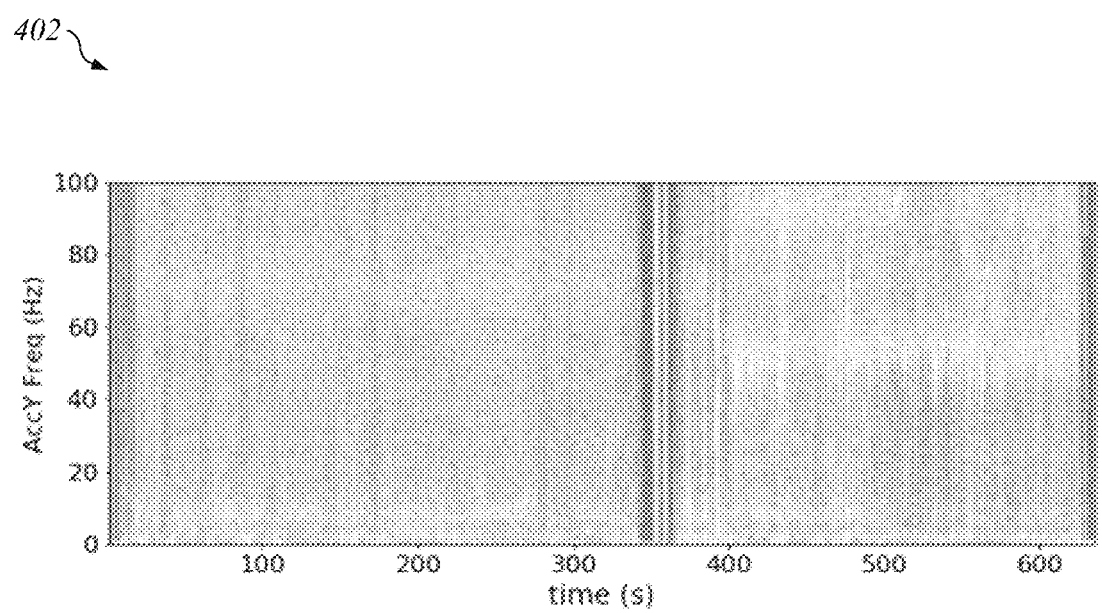
FIG. 4B is a spectrogram illustrating frequency of acceleration of the scooter in a direction along a second axis of the scooter perpendicular to the first axis over time.
Figure 4C:
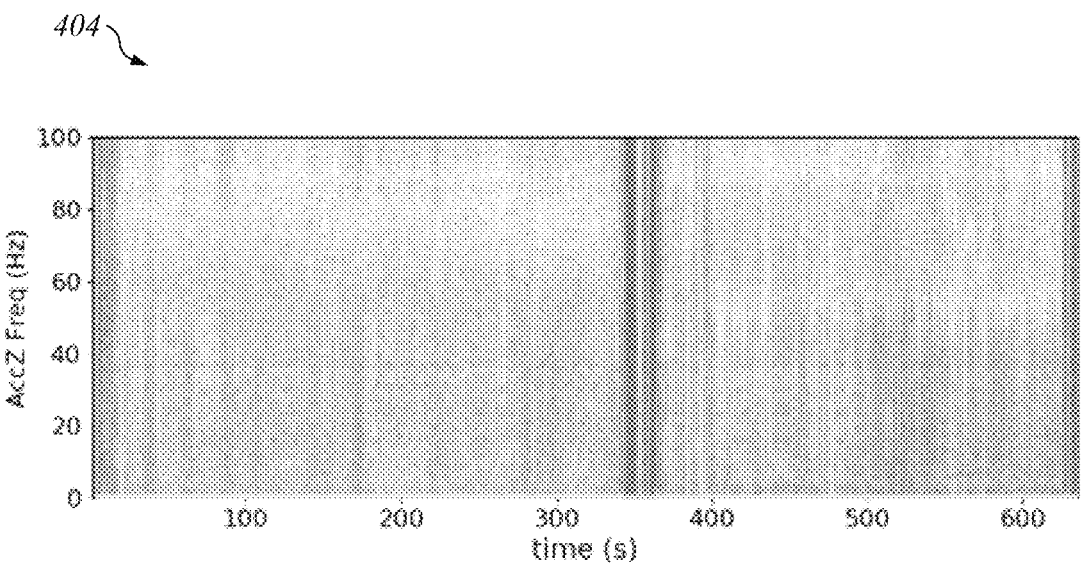
FIG. 4C is a spectrogram illustrating frequency of acceleration of the scooter in a direction along a third axis of the scooter perpendicular to the first axis and the second axis over time.
Figure 4D:
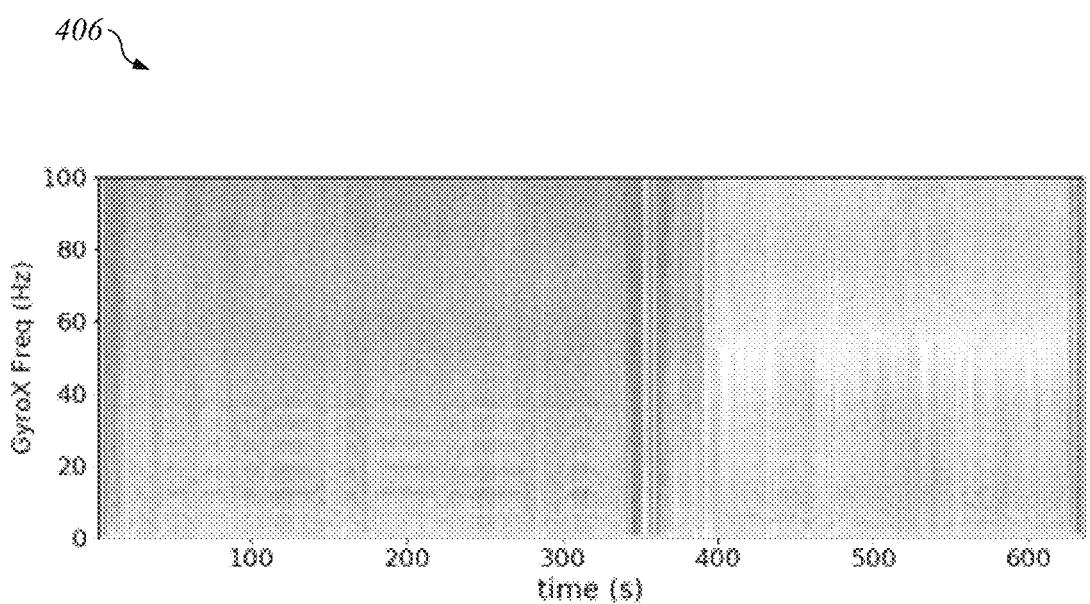
FIG. 4D is a spectrogram illustrating frequency of rotation of the scooter about the first axis over time.
Figure 4E:
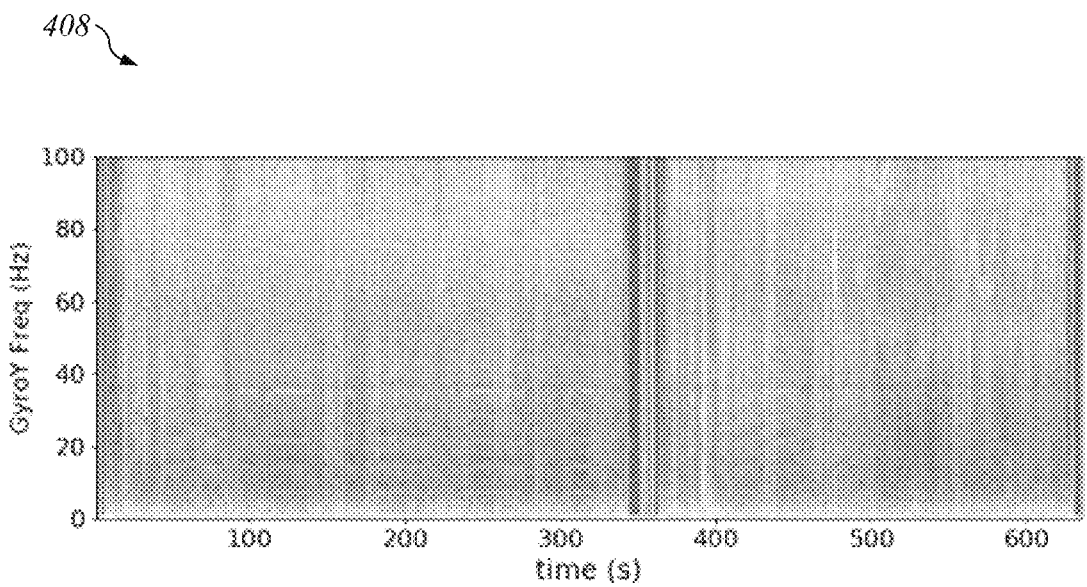
FIG. 4E is a spectrogram illustrating frequency of rotation of the scooter about the second axis over time.
Figure 4F:
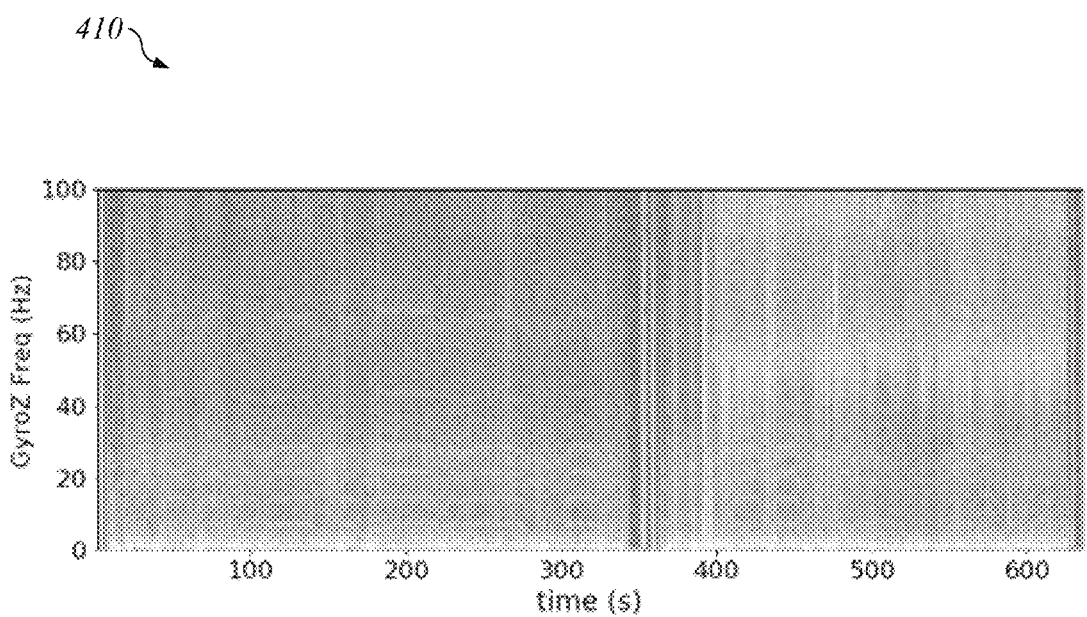
FIG. 4F is a spectrogram illustrating frequency of rotation of the scooter about the third axis over time.

FIGS. 4A-4F are spectrograms of motion data of a scooter detected by an IMU in a scenario in which the scooter was driven on a bike lane from 0 to 400 seconds, and in which the scooter was driven on a sidewalk from 400 to 600 seconds. FIG. 4A is a spectrogram 400 illustrating frequency of acceleration of the scooter in a direction along a first axis of a scooter over time. FIG. 4B is a spectrogram 402 illustrating frequency of acceleration of the scooter in a direction along a second axis of the scooter perpendicular to the first axis over time. FIG. 4C is a spectrogram 404 illustrating frequency of acceleration of the scooter in a direction along a third axis of the scooter perpendicular to the first axis and the second axis over time. FIG. 4D is a spectrogram 406 illustrating frequency of rotation of the scooter about the first axis over time. FIG. 4E is a spectrogram 408 illustrating frequency of rotation of the scooter about the second axis over time. FIG. 4F is a spectrogram 410 illustrating frequency of rotation of the scooter about the third axis over time.

As illustrated in FIGS. 4A-4F, a pattern of frequency of acceleration and rotation over time along each axis of the electric scooter 100 changes when the electric scooter 100 is driven from the bike lane to the sidewalk at around 400 seconds. The processor 114 can receive motion data from the IMU or other movement sensor 110, perform a spectrum analysis on the motion data (for example, as shown in FIGS. 4A-4F), and determine the riding environment of the electric scooter 100 by comparing results of the spectrum analysis to predetermined movement patterns indicative of particular riding environments.

Figure 5:
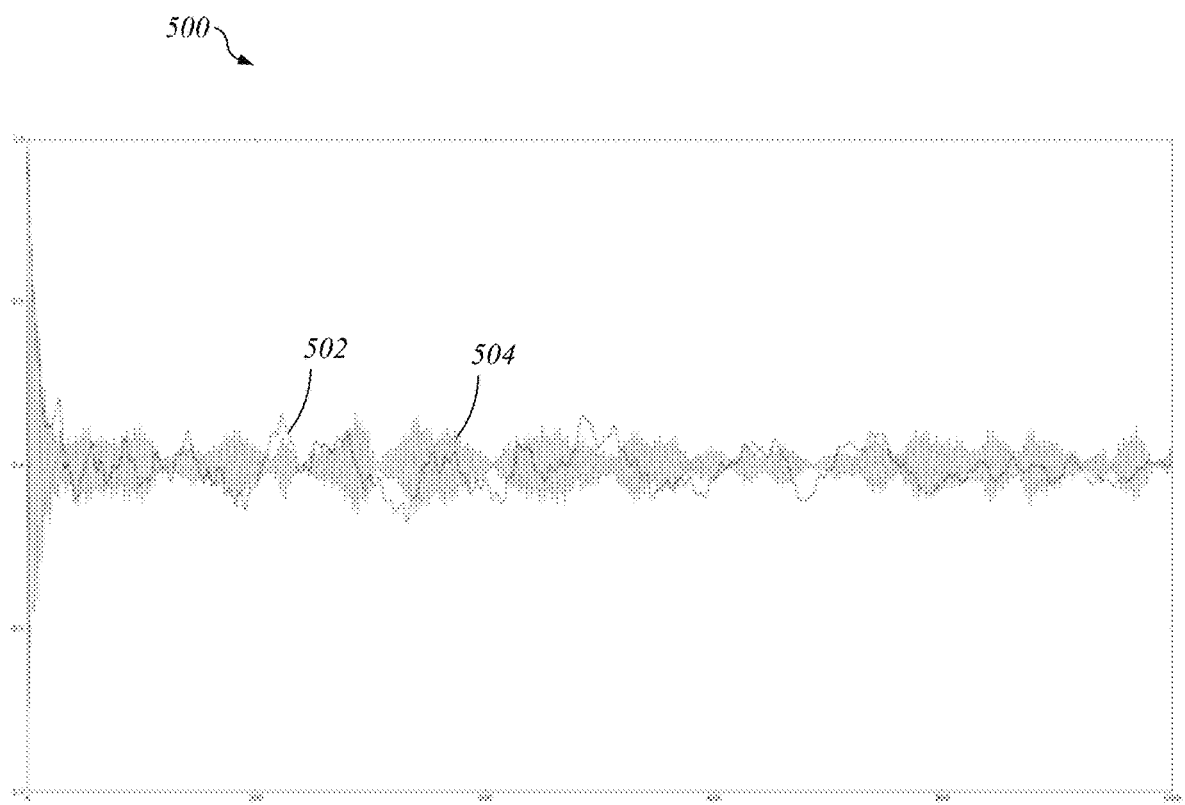
FIG. 5 is an auto-correlation plot of the data graphed in FIG. 4D according to one example.

FIG. 5 illustrates one example of an auto-correlation plot 500 of the data graphed in FIG. 4D. The line 502 shown in FIG. 5 illustrates an auto-correlation of the frequency of rotation of the scooter about the first axis measured by the IMU while the scooter was driven on the bike lane. The line 504 shown in FIG. 5 illustrates an auto-correlation of the frequency of rotation of the scooter about the first axis measured by the IMU while the scooter was driven on the sidewalk. As illustrated by FIG. 5, the auto-correlation of the scooter's sidewalk motion data shows a high frequency component over a broad shift range. The processor 114 can determine whether the riding environment of the electric scooter 100 is a pedestrian walkway based on an autocorrelation of the motion data from the movement sensor 110 as shown in FIG. 5. Determination of the riding environment of the electric scooter 100 by the processor 114 using data from the movement sensor 110 is not limited to the examples shown and described.

In some embodiments, the processor 114 can determine the riding environment of the electric scooter 100 from the motion data transmitted by the movement sensor 110 using a machine learning classifier 115. As shown in FIG. 3, the machine learning classifier 115 is implemented in the processor 114. In other embodiments, the machine learning classifier 115 is implemented separately from the processor 114. The machine learning classifier 115 can be configured to generate movement patterns indicative of particular riding environments (e.g. a pedestrian walkway) based on motion data previously received from the movement sensor 110. The processor 114 can be configured to determine whether the riding environment of the scooter is a pedestrian walkway based on the motion data by using the machine learning classifier 115 to determine that the current motion data matches a movement pattern generated by the machine learning classifier 115 using previous motion data received from the movement sensor.

The processor 114 can determine whether the riding environment of the electric scooter 100 is a pedestrian walkway based on riding environment data received from the image capture device 112. The image capture device 112 can detect features of the riding environment over the measurement period as previously described. For example, the image capture device 112 can capture images or video of obstacles, road markings (e.g. bike lane markings or road lane markings) and road signs (e.g. stop signs, yield signs, one-way signs, or bike lane signs) within a field of view of the image capture device 112. The image capture device 112 can transmit riding environment data indicative of the detected features of the riding environment to the processor 114. The processor 114 can use one or more algorithms (e.g. AI pedestrian detection algorithms, AI bike lane detection algorithms, or AI sidewalk detection algorithms) to determine whether the riding environment is a pedestrian walkway based on the riding environment data. The one or more algorithms can be stored in a memory included in the processor 114 and executed by the processor 114.

In one example, the image capture device 112 can detect pavement lane markings and the processor 114 can identify a pavement lane based on the riding environment data. Pavement lane markings may include edges of pavement, road markings, bike lane markings, or any other feature that can be used to define a pavement lane. The processor 114 can determine a width of the pavement lane based on the pavement lane markings. The processor 114 can compare the width of the detected pavement lane to a predetermined range of widths indicative of a pedestrian walkway. If the processor 114 determines that the width of the detected pavement lane is within the predetermined range, the processor 114 can determine that the riding environment of the electric scooter 100 is a pedestrian walkway and activate the alarm 116. If the processor 114 determines that the width of the detected pavement lane is not within the predetermined range, the processor 114 may determine that the riding environment of the electric scooter 100 is not a pedestrian walkway.

Figure 6:
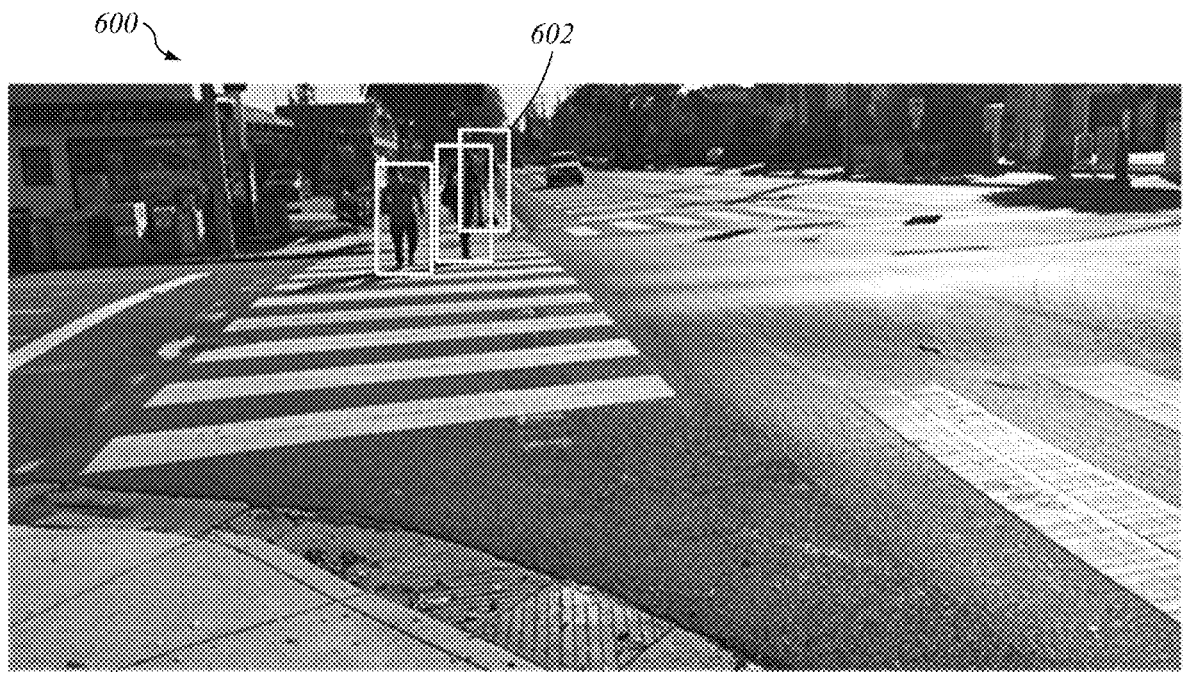
FIG. 6 is an image captured by a front-facing image capture device attached to the electric scooter, according to a first example.

FIG. 6 is an illustration of the processor 114 determining that obstacles are located in front of the electric scooter 100 based on riding environment data transmitted by the image capture device 112. The image shown in FIG. 6 is a first example of an image 600 captured by a front-facing image capture device 112 attached to the electric scooter 100. In FIG. 6, the processor 114 has executed an obstacle detection algorithm, determined that three obstacles (e.g. two pedestrians and a traffic sign) are located in front of the electric scooter 100, and has identified the obstacles. In the illustrated, non-limiting example, the processor 114 has identified the obstacles by creating an outline 602 around the obstacles in the image received from the image capture device 112. The processor 114 can identify obstacles in approximately 40 milliseconds or in any other duration. In response to determining the location of the obstacles in front of the electric scooter 100, the processor 114 can activate the alarm 116 to alert the user and/or the pedestrians of the electric scooter's proximity to the obstacles. The determination by the processor 114 that one or more obstacles are located near the electric scooter 100 based on the data transmitted from the image capture device 112 is not limited to the examples shown and described.

Figure 7:
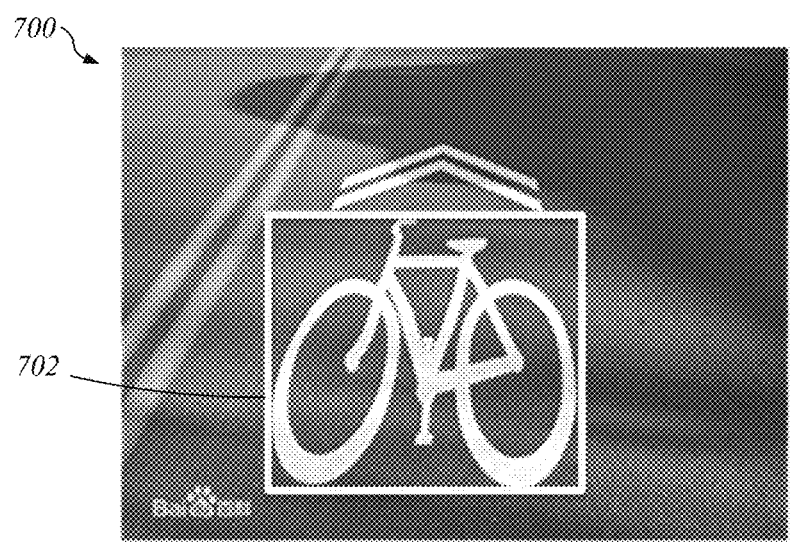
FIG. 7 is an image captured by the front-facing image capture device attached to the electric scooter, according to a second example.

FIG. 7 is an illustration of the processor 114 determining that the riding environment of the electric scooter 100 is a bike lane based on riding environment data transmitted by the image capture device 112. The image shown in FIG. 7 is second example of an image 700 captured by a front-facing image capture device 112 attached to the electric scooter 100. In FIG. 7, the processor 114 has detected a road marking based on the riding environment data received from the image capture device 112, executed a road marking detection algorithm, and determined that the riding environment of the electric scooter 100 is a bike lane based on the riding environment data. In the illustrated, non-limiting example, the processor 114 has identified the bike lane road marking by creating an outline 702 around the bike lane road marking in the image received from the image capture device 112. The determination by the processor 114 of the riding environment of the electric scooter 100 based on the data transmitted from the image capture device 112 is not limited to the examples shown and described.

Figure 8:
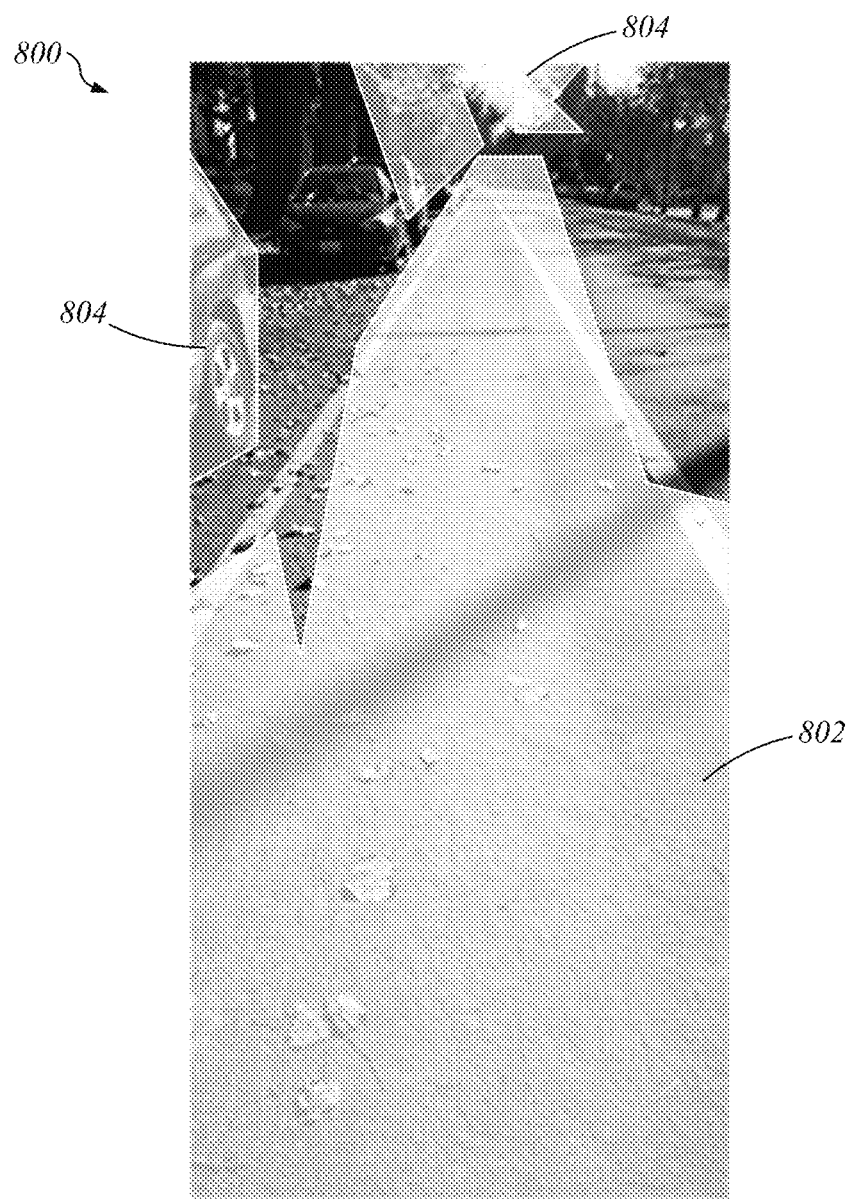
FIG. 8 is an image captured by the front-facing image capture device attached to the electric scooter, according to a third example.

The processor 114 can determine a potential drivable path of the electric scooter 100 based on riding environment data transmitted by the image capture device 112. The processor 114 can receive the riding environment data from the image capture device 112 and execute one or more algorithms to identify drivable paths free of obstacles on which the electric scooter 100 can be driven. An algorithm used to identify the potential drivable path can include a pixel-level object semantic segmentation algorithm. If the processor 114 determines that no potential driving path exists, the processor 114 can activate the alarm 116 to alert the user and/or nearby pedestrians. FIG. 8 is an illustration of the processor 114 determining a drivable path of the electric scooter 100 along a bike lane based on riding environment data transmitted by the image capture device 112. The image shown in FIG. 8 is a third example of an image 800 captured by a front-facing image capture device 112 attached to the electric scooter 100. In FIG. 8, the processor 114 has executed an algorithm to identify and outline area 802 as a drivable path based on the riding environment data from the image capture device 112. The processor 114 has also executed the algorithm to identify and outline areas 804 as obstacles. If the processor 114 determines that the electric scooter 100 is closer than a predetermined distance (e.g. three feet or any other distance) to an obstacle based on data from the proximity sensor 118 and/or the image capture device 112, the processor 114 may activate the alarm 116. The determination by the processor 114 of a drivable path based on the data transmitted from the image capture device 112 is not limited to the examples shown and described.

The processor 114 can execute one or more algorithms to determine a region of interest (ROI) of the riding environment data captured by the image capture device 112. The ROI can include a portion of an image captured by the image capture device 112. After determining the ROI of the riding environment data from the image capture device 112, the processor 114 may further process the riding environment data within the ROI using one or more of the previously described algorithms (e.g. obstacle detection or drivable path determination algorithms). For example, the processor may be configured to determine whether the riding environment of the scooter is a pedestrian walkway based on riding environment data within the ROI. The processor 114 may exclude riding environment data outside of the ROI. This process may reduce the time required for the processor 114 to detect obstacles, determine whether a drivable path exists, and to determine whether the riding environment is a pedestrian walkway. For example, a front-facing camera attached to the electric scooter 100 may capture an image of an area several feet (e.g. 30 feet) in front of the electric scooter 100. The processor 114 can determine a reduced ROI (e.g. a portion of the image 5 feet in front of the electric scooter 100) and can detect obstacles only located in the ROI, detect drivable paths only located in the ROI, and determine whether the riding environment within only the ROI is a pedestrian walkway.

The processor 114 and/or the image capture device 112 can reduce the resolution of an image or video captured by the image capture device 112 to reduce the time required for the processor 114 to detect obstacles, to determine whether a drivable path exists, and to determine whether the riding environment is a pedestrian walkway.

Figure 9:
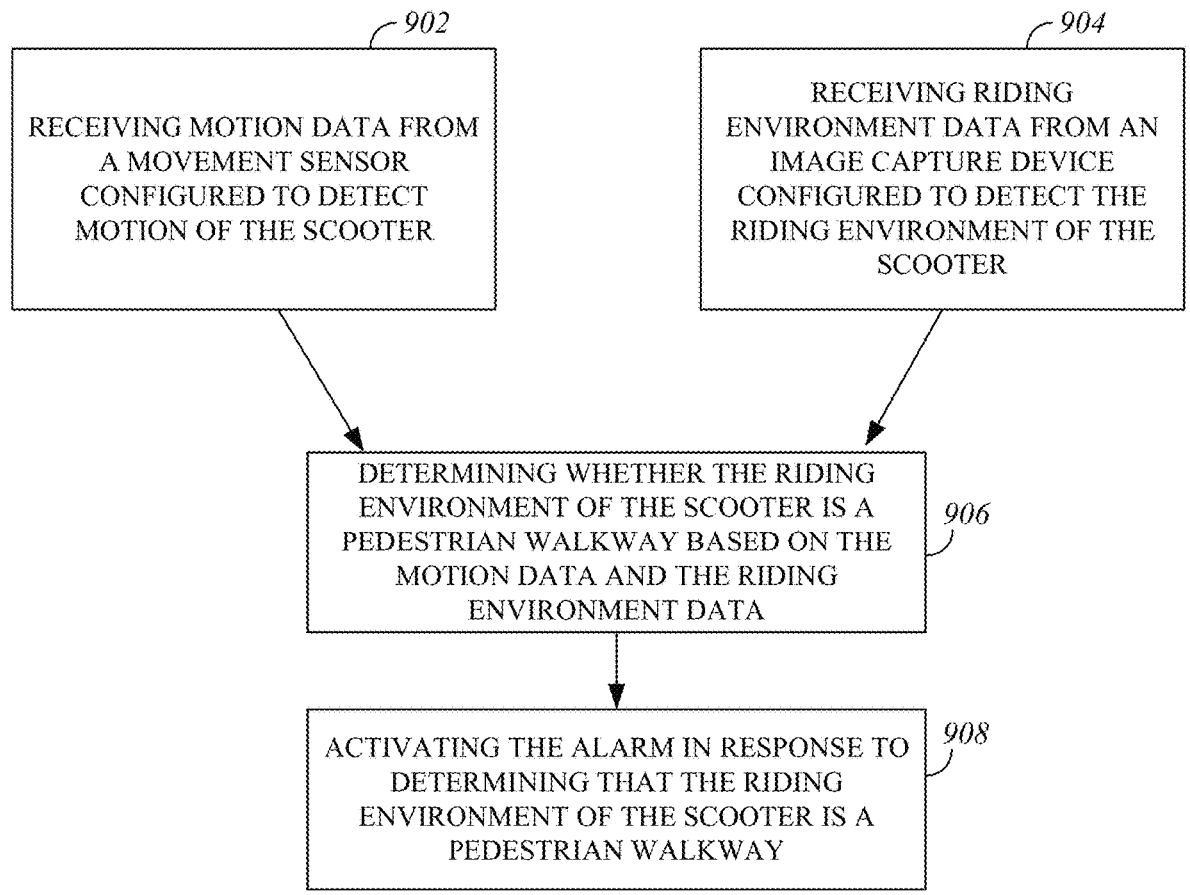
FIG. 9 is a flowchart of a process for determining a riding environment of the electric scooter according to a first example.

The processor 114 can determine whether the riding environment of a scooter (e.g. the electric scooter 100) is a pedestrian walkway based on motion data transmitted by the movement sensor 110 and/or riding environment data transmitted by the image capture device 112. FIG. 9 is a flowchart of a process for determining the riding environment of the electric scooter 100 according to a first example. At operation 902, the movement sensor 110 detects motion of the electric scooter 100 and the processor 114 receives the motion data indicative of the motion from the movement sensor 110. At operation 904, the image capture device 112 detects features of the riding environment of the electric scooter 100 and the processor receives riding environment data indicative of the features from the image capture device 112. Operations 902 and 904 may or may not occur simultaneously.

At operation 906, the processor 114 determines whether the riding environment of the scooter is a pedestrian walkway based on the motion data and the riding environment data. The processor 114 may determine whether the riding environment of the scooter is a pedestrian walkway based on the motion data before or after determining whether the riding environment of the scooter is a pedestrian walkway based on the riding environment data. In other embodiments, the processor 114 may determine whether the riding environment of the scooter is a pedestrian walkway based on the motion data and the riding environment data simultaneously. In yet other embodiments, the processor 114 may determine whether the riding environment of the scooter is a pedestrian walkway based on only the motion data or only the riding environment data. At operation 908, the processor 114 activates the alarm 116 in response to determining that the riding environment of the electric scooter 100 is a pedestrian walkway.

Figure 10:
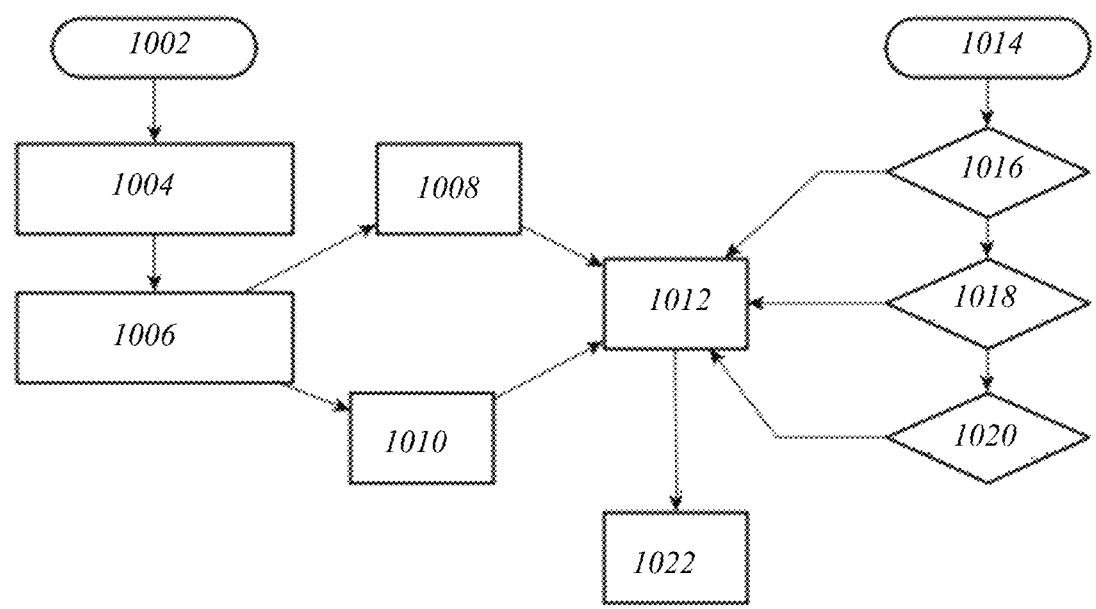
FIG. 10 is a flowchart of a process for determining the riding environment of the electric scooter 100 according to a second example.

FIG. 10 is a flowchart of a process for determining the riding environment of the electric scooter 100 according to a second example. At operation 1002, the movement sensor 110 detects motion of the electric scooter 100 over a measurement period and the processor 114 receives the motion data indicative of the motion from the movement sensor 110. At operation 1004, the processor 114 processes the motion data to determine whether the motion data is indicative of a pedestrian walkway. Processing the motion data can include performing a spectrum analysis and/or an auto-correlation analysis of the motion data. At operation 1006, the processor 114 analyzes the processed motion data using the machine learning classifier 115. At operation 1008, the machine learning classifier 115 identifies at least a first portion of the motion data as a bike lane. At operation 1010, the machine learning classifier 115 identifies at least a second portion of the motion data as indicative of a sidewalk. At operation 1012, the processor 114 determines whether to activate the alarm 116.

At operation 1014, the image capture device 112 detects features of the riding environment of the electric scooter 100 and the processor 114 receives riding environment data indicative of the features from the image capture device 112. Operation 1014 may occur simultaneously or not simultaneously with operation 1002. At operation 1016, the processor identifies a ROI of the riding environment data and determines whether a pedestrian or other obstacle is present based on the riding environment data within the ROI. If the processor 114 identifies a pedestrian or other obstacle within the ROI, the process can proceed to operation 1012. If the processor 114 does not identify a pedestrian or other obstacle within the ROI, the process can proceed to operation 1018. At operation 1018, the processor 114 determines whether a drivable path exists in front of the electric scooter 100 based on the riding environment data. If the processor 114 determines that a drivable path exists, the process can proceed to operation 1020. If the processor 114 determines that no drivable path exists, the process can proceed to operation 1012. At operation 1020, the processor 114 determines whether the riding environment of the electric scooter 100 is a pedestrian walkway based on the riding environment data. In response to determining whether the riding environment of the electric scooter 100 is a pedestrian walkway, the process proceeds to operation 1012.

At operation 1012, the processor 114 determines whether to activate the alarm 116 based on one or more factors, including but not limited to: identification of the processed movement data as indicative of a bike lane or sidewalk by the machine learning classifier 115; a determination by the processor 114 that a pedestrian or other obstacle is located in the ROI, a determination by the processor 114 that no drivable path exists in front of the electric scooter 100; or a determination by the processor 114 that the riding environment of the electric scooter 100 is a pedestrian walkway based on the data transmitted from the image capture device 112. Another factor may include operation parameters (discussed above) received by the communication interface 122 and transmitted to the processor 114.

The processor 114 can activate the alarm 116 after a delay period has expired. The delay period can begin in response to the processor 114 determining that the riding environment of the electric scooter 100 is a pedestrian walkway. The length of the delay period can be customizable by the user or by a scooter provider.

At operation 1022, the processor 114 activates the alarm 116. Particular factors used by the processor 114 to determine whether to activate the alarm 116 may be given greater or lesser weight relative to other factors. In one example, the processor 114 can determine an average riding environment status (e.g. pedestrian walkway or not pedestrian walkway) over the measurement period. If the average riding environment status is determined by the processor 114 to indicate a pedestrian walkway, the process can proceed to operation 1022. If the average riding environment status is not determined to indicate a pedestrian walkway, the process can proceed to operation 1002 and/or operation 1014. The determination by the processor 114 to activate the alarm 116 is not limited to the examples shown and described.

Embodiments of the processor 114, the machine learning classifier 115, and/or any other electrical component of the electric scooter 100 (and the algorithms, methods, instructions, processes, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the processor 114, the machine learning classifier 115, or other electrical components of the electric scooter 100 do not necessarily have to be implemented in the same manner.

Further, in one aspect, for example, the processor 114, the machine learning classifier 115, or any other electrical components of the electric scooter 100 can be implemented using a general-purpose computer or general-purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Further, all or a portion of embodiments of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this disclosure, the term "or" is intended to mean an inclusive "or" rather than an exclusive "or" for two or more elements it conjoins. That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. The term "and/or" used in this disclosure is intended to mean an "and" or an inclusive "or." That is, unless specified otherwise, or clear from context, "X includes A, B, and/or C" is intended to mean X can include any combinations of A, B, and C. In other words, if X includes A; X includes B; X includes C; X includes both A and B; X includes both B and C; X includes both A and C; or X includes all A, B, and C, then "X includes A and/or B" is satisfied under any of the foregoing instances. Similarly, "X includes at least one of A, B, and C" is intended to be used as an equivalent of "X includes A, B, and/or C." In addition, the articles "a" and "an" as used in this application and the appended claims should generally be construed to mean "one or more" unless specified otherwise or clear from context to be directed to a singular form. Moreover, use of the term "an aspect" or "one aspect" throughout is not intended to mean the same embodiment or aspect unless described as such.

The use of "including" or "having" and variations thereof herein is meant to encompass the items listed thereafter and equivalents thereof as well as additional items. Unless specified or limited otherwise, the terms "mounted," "connected," "supported," and "attached" and variations thereof are used broadly and encompass both direct and indirect mountings, connections, supports, and couplings. Further, "connected" and "attached" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein is merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed.

It should be understood that although this disclosure uses terms such as first, second, third, etc., the disclosure should not be limited to these terms. These terms are used only to distinguish similar types of information from each other. For example, without departing from the scope of this disclosure, a first information can also be referred to as a second information; and similarly, a second information can also be referred to as a first information. Depending on the context, the words "if" as used herein can be interpreted as "when," "while," or "in response to."

While the invention has been described in connection with certain embodiments, it is to be understood that the invention is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law. One or more elements of the embodiments disclosed may be combined with one or more elements of any other embodiment disclosed.

What is claimed is:

1. A scooter comprising:
an alarm;
a movement sensor configured to detect motion of the scooter and transmit motion data indicative of the motion to a processor,
wherein the processor is configured to determine whether a riding environment of the scooter is a pedestrian walkway based on the motion data, and
wherein the processor is configured to activate the alarm in response to determining that the riding environment of the scooter is a pedestrian walkway; and
an image capture device configured to detect features of the riding environment and transmit riding environment data indicative of the features to the processor,
wherein the processor is configured to determine whether the riding environment of the scooter is a pedestrian walkway based on the riding environment data and the motion data, and
wherein the processor is configured to determine that the riding environment of the scooter is a pedestrian walkway based on the riding environment data in response to:
identifying a pavement lane based on the riding; environment data;
determining a width of the pavement lane; and
determining that the width of the pavement lane is within a predetermined range.

2. The scooter of claim 1, wherein the processor is configured to determine that the riding environment of the scooter is a pedestrian walkway based on the motion data in response to determining that the motion data matches a predetermined movement pattern.

3. The scooter of claim 2, wherein the predetermined movement pattern includes periodic vibration of the scooter.

4. The scooter of claim 1, wherein the features of the riding environment include obstacles, traffic signs, traffic signals, or road markings.

5. The scooter of claim 1, wherein the processor is configured to determine a region of interest of the riding environment data from the image capture device, and wherein the processor is configured to determine whether the riding environment of the scooter is a pedestrian walkway based on riding environment data within the region of interest.

6. The scooter of claim 1, wherein:
the processor includes a machine learning classifier configured to receive current motion data from the movement sensor; and
the processor is configured to determine whether the riding environment of the scooter is a pedestrian walkway based on the motion data by using the machine learning classifier to determine that the current motion data matches a movement pattern generated by the machine learning classifier using previous motion data received from the movement sensor.

7. The scooter of claim 1, wherein the movement sensor is at least one of an inertial measurement unit configured to detect vibration of the scooter or an audio sensor configured to detect sound resulting from contact between a wheel of the scooter and a riding surface of the scooter.

8. The scooter of claim 1, wherein the alarm includes at least one of a display configured to generate a notification in response to the processor activating the alarm, a light configured to illuminate in response to the processor activating the alarm, or a speaker configured to emit a sound in response to the processor activating the alarm.

9. A method for activating an alarm in response to determining that a riding environment of a scooter is a pedestrian walkway, comprising:
receiving motion data from a movement sensor configured to detect motion of the scooter;
receiving riding environment data from an image capture device configured to detect the riding environment of the scooter;
determining whether the riding environment of the scooter is a pedestrian walkway based on the motion data and the riding environment data, wherein determining that the riding environment of the scooter is a pedestrian walkway based on the riding environment data comprises:
identifying a pavement lane based on the riding environment data;
determining a width of the pavement lane; and
determining that the width of the pavement lane is within a predetermined range; and
activating the alarm in response to determining that the riding environment of the scooter is a pedestrian walkway.

10. The method of claim 9, wherein determining that the riding environment of the scooter is a pedestrian walkway based on the motion data comprises determining that the motion data matches a predetermined movement pattern.

11. The method of claim 9, wherein determining whether the riding environment of the scooter is a pedestrian walkway based on the motion data comprises using a machine learning classifier configured to determine whether current motion data received by the machine learning classifier from the movement sensor matches a movement pattern generated by the machine learning classifier using previous motion data received by the machine learning classifier from the movement sensor.

12. The method of claim 9, comprising determining a region of interest of the riding environment data from the image capture device; and determining whether the riding environment of the scooter is a pedestrian walkway based on riding environment data within the region of interest.

13. A scooter alarm and pedestrian walkway detection system, comprising:
an alarm;
a movement sensor configured to detect motion of a scooter and transmit motion data indicative of the motion to a processor; and
an image capture device configured to detect features of a riding environment of the scooter and transmit riding environment data indicative of the features to the processor,
wherein the processor is configured to determine whether the riding environment of the scooter is a pedestrian walkway based on the motion data and the riding environment data,
wherein the processor is configured to activate the alarm in response to determining that the riding environment of the scooter is a pedestrian walkway, and
wherein the processor is configured to determine that the riding environment of the scooter is a pedestrian walkway based on the riding environment data in response to:
identifying a pavement lane based on the riding environment data;
determining a width of the pavement lane, and
determining that the width of the pavement lane is within a predetermined range.

14. The scooter alarm and pedestrian walkway detection system of claim 13, wherein the processor is configured to determine that the riding environment of the scooter is a pedestrian walkway based on the motion data in response to determining that the motion data matches a predetermined movement pattern.

15. The scooter alarm and pedestrian walkway detection system of claim 13, wherein the processor is configured to determine a region of interest of the riding environment data from the image capture device, and wherein the processor is configured to determine whether the riding environment of the scooter is a pedestrian walkway based on riding environment data within the region of interest.

16. The scooter alarm and pedestrian walkway detection system of claim 13, wherein:
the processor includes a machine learning classifier configured to receive current motion data from the movement sensor; and
the processor is configured to determine whether the riding environment of the scooter is a pedestrian walkway based on the motion data by using the machine learning classifier to determine that the current motion data matches a movement pattern generated by the machine learning classifier using previous motion data received by the machine learning classifier from the movement sensor.

17. The method of claim 9, wherein the movement sensor is at least one of an inertial measurement unit configured to detect vibration of the scooter or an audio sensor configured to detect sound resulting from contact between a wheel of the scooter and a riding surface of the scooter.

18. The method of claim 9, wherein the alarm includes at least one of a display configured to generate a notification in response to activating the alarm, a light configured to illuminate in response to activating the alarm, or a speaker configured to emit a sound in response to activating the alarm.

19. The scooter alarm and pedestrian walkway detection system of claim 13, wherein the movement sensor is at least one of an inertial measurement unit configured to detect vibration of the scooter or an audio sensor configured to detect sound resulting from contact between a wheel of the scooter and a riding surface of the scooter.

20. The scooter alarm and pedestrian walkway detection system of claim 13, wherein the alarm includes at least one of a display configured to generate a notification in response to the processor activating the alarm, a light configured to illuminate in response to the processor activating the alarm, or a speaker configured to emit a sound in response to the processor activating the alarm.

* * * * *